US007821439B2

(12) United States Patent
Replogle et al.

(10) Patent No.: US 7,821,439 B2
(45) Date of Patent: Oct. 26, 2010

(54) PROGRAMMABLE CAN BUS TO ANALOGUE SIGNAL CONVERTER (75) Inventors: Gavin L. Replogle, Avilla, IN (US); Joshua D. Cryer, Ft. Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 80 days.

(21) Appl. No.: 12/423,259

(22) Filed: Apr. 14, 2009

(65) Prior Publication Data

US 2009/0265489 A1 Oct. 22, 2009

Related U.S. Application Data (60) Provisional application No. 61/046,970, filed on Apr. 22, 2008.

(51) Int. Cl.
*H03M 1/82* (2006.01)

(52) U.S. Cl. .......................... 341/152; 341/144; 701/207
(58) Field of Classification Search ................. 341/152, 341/144, 141; 701/102, 207; 73/114.03
See application file for complete search history.

(56) References Cited

U.S. PATENT DOCUMENTS

| 6,381,406 | B1 * | 4/2002 | Smith et al. ................ 318/799 |
| 6,504,427 | B2 * | 1/2003 | Midya et al. ................ 330/10 |
| 7,760,120 | B2 * | 7/2010 | Mace et al. ................ 341/152 |
| 2005/0247182 | A1 * | 11/2005 | Sasaki et al. ................ 84/13 |

* cited by examiner

*Primary Examiner*—Peguy JeanPierre
(74) *Attorney, Agent, or Firm*—Jeffrey P. Calfa; Mark C. Bach (57) ABSTRACT A module (10) connects to a CAN bus in a motor vehicle and converts a CAN message into an analog signal that can be monitored by test equipment. The module also has wireless communication with a PDA (300) via a radio transceiver (28) to allow the PDA to display a converted CAN message and to select different messages for display.

9 Claims, 8 Drawing Sheets

PROGRAMMABLE CAN BUS TO ANALOGUE SIGNAL CONVERTER

REFERENCE TO A RELATED APPLICATIONS

This application claims the priority of Provisional Patent Application No. 61/046,970, filed 22 Apr. 2008.

BACKGROUND

Embodiments disclosed herein relate generally to electrical systems that present electronic data as Controller Area Network (CAN) messages on a CAN bus. In particular, the embodiments relate to a device that can connect to such a bus, convert CAN messages on the bus to analog signals, and display a decoded message on a handheld device via Bluetooth wireless communication.

The electrical systems of many mass-produced motor vehicles have busses on which data is presented in electronic form. An example is a CAN data bus. For diagnostic and/or development purposes, it is often desirable that data on a CAN bus be presented in analog form because such a mode of presentation is more readily perceptible to personnel who must examine the data and/or use it to drive data acquisition equipment.

A convenient way for a technician to observe the speed of a running engine is to look at an analog display where speed is presented graphically, sometimes as a function of time. A way means of doing this is by means of a pick-up, or sensor, that is located proximate a rotating part of the engine and that delivers a pulse signal that is easily converted to analog form.

When the source of the data is a CAN bus, a device that can read the data on the bus and convert it to such a display is needed. A commercially available device for doing this is sold under the brand name "Cubic Labs NC2".

It is believed that the "Cubic Labs NC2" device must be programmed in advance of use in the field by a computer, such as a laptop or desktop, using a special program. The programming is understood to adapt the device so that the device will retrieve a particular parameter of interest in the field, but having been programmed to retrieve that parameter, cannot be re-programmed in the field to retrieve a different parameter. It is believed that the selling price of the "Cubic Labs NC2" device discourages its widespread use among service facilities.

Accordingly, a less expensive, more versatile device may enjoy more widespread use that would benefit service facilities and service personnel, not only in the motor vehicle industry, but in any industry where machines and the like have electrical systems containing CAN busses (i.e. household appliances, aviation and medical devices).

SUMMARY

Some embodiments disclosed herein provide a module for converting a CAN message into an analog signal. In one embodiment, the module comprises one or more connectors providing an input for connection of the module to a CAN bus and an output terminal at which the analog signal is presented. A microcontroller containing an algorithm for seeking a particular message on the CAN bus and when the particular message appears on the bus, for converting the particular message to a proportional PWM signal that is presented at an output of the microcontroller in included. An RC integrator connects the output of the microcontroller to the output terminal of the one or more connectors at which the analog signal is presented.

Another embodiment provides a system for converting a CAN message on a CAN bus in a motor vehicle into visual data that can be read on a display. One or more connectors provide for connection of a module to the CAN bus and to an electrical power supply of the vehicle. The module contains a microcontroller that is powered by the vehicle power supply and contains an algorithm for seeking a particular message on the CAN bus and when the particular message appears on the bus, for converting the particular message to a signal that is presented at an output of the microcontroller. A first transceiver is provided for converting the signal at the output of the microcontroller to a wireless signal that is transmitted to a device containing the display. The device comprises a second transceiver for receiving the wireless signal and converting it into visual data on the display.

DETAILED DESCRIPTION

Figure 1:
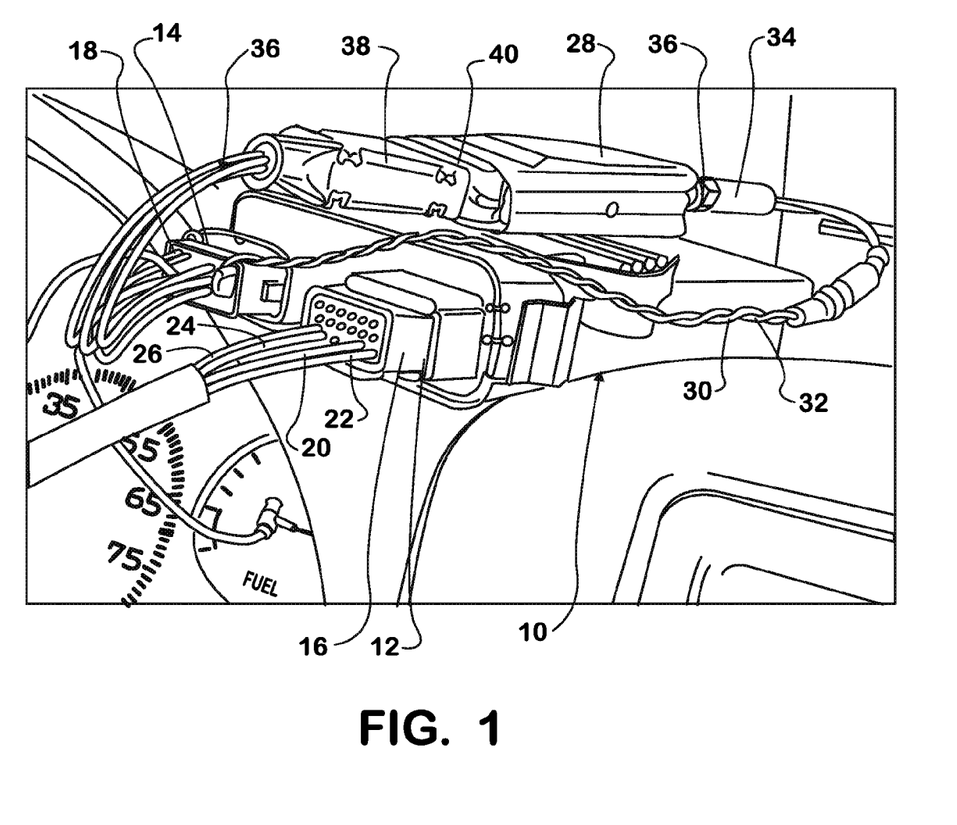
FIG. 1 is a perspective view of a module disposed atop an instrument panel in a motor vehicle electrical system and operatively connected with the electrical system.
Figure 3:
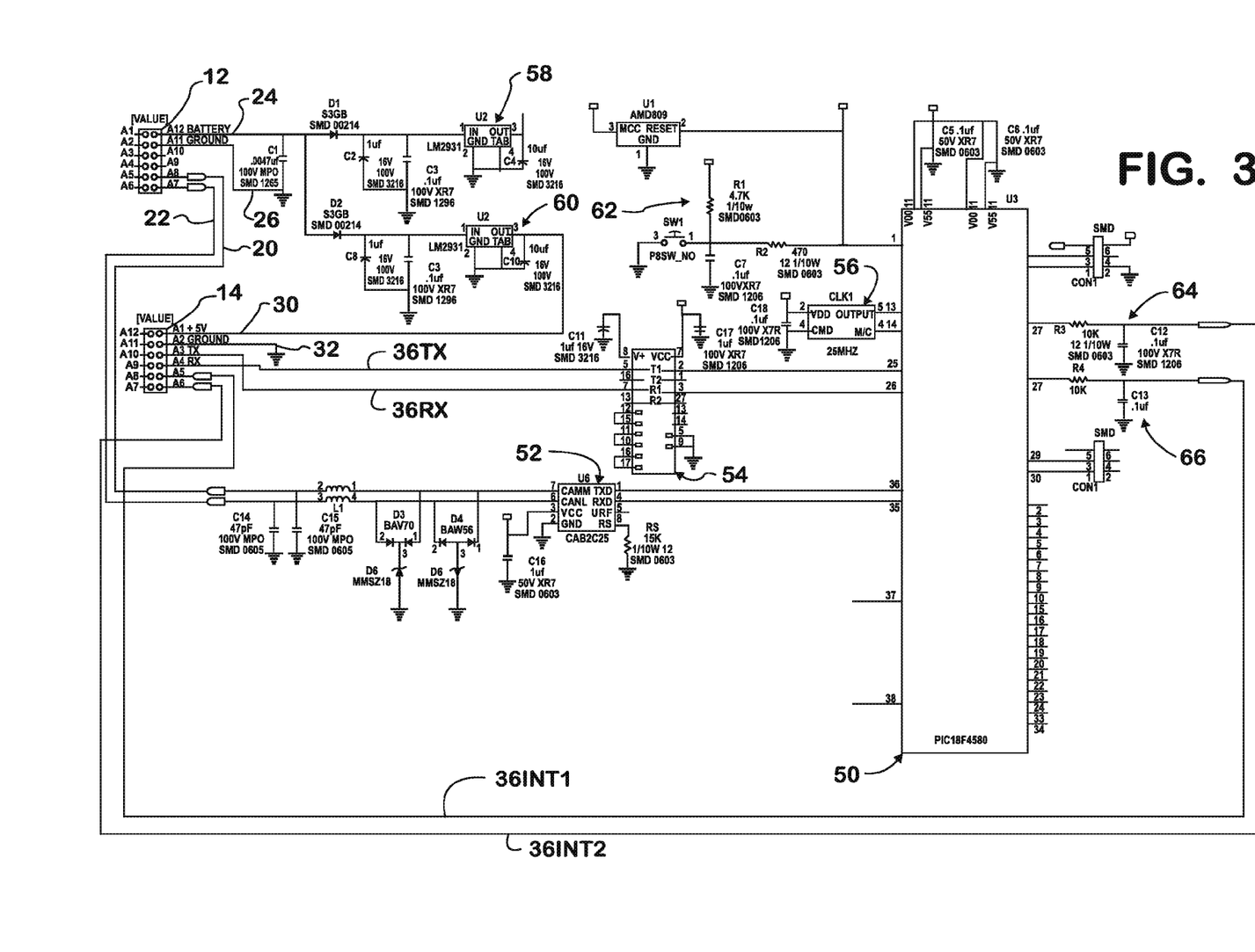
FIG. 3 is a detailed electric circuit diagram of the module.

FIG. 1 shows a module 10 having an interior that contains a circuit board on which the circuit of FIG. 3 is implemented. Module 10 is lying on the top of an instrument panel in a truck. Circuit connections from the board to the truck electrical system are established through electrical connectors 12, 14 at the exterior of the module housing to which mating connectors 16, 18 respectively are connected. Insulated wires 20, 22 coming from connector 16 are part of a cable that connects each of the two wires to CAN-H and CAN-L of a CAN bus of the truck electrical system via a connector (not shown) at the opposite end of the cable that connects to a standard 9-way diagnostic connector that is present in the truck. Insulated wires 24, 26 also coming from connector 16 connect to terminals of the diagnostic connector that are connected to the truck's DC power supply, typically battery voltage of nominal +12 VDC. That voltage is delivered via wires 24, 26 to provide DC power for module 10.

A radio transceiver 28 is lying on top of module 10. A pair of wires 30, 32 extends from connector 18 to a connector 34 that connects to a mating connector 36 at the rear of transceiver 28. Other wires, collectively marked by the reference numeral 36A, come from connector 18 to a connector 38 that connects to a mating connector 40 at the front of transceiver 28.

The wires 30, 32 supply DC power to the transceiver. The wires from mating connector 40 provide the digital output of the module to the transceiver. The actual connections of individual wires will be seen in the detailed schematic of FIG. 3.

Figure 2:
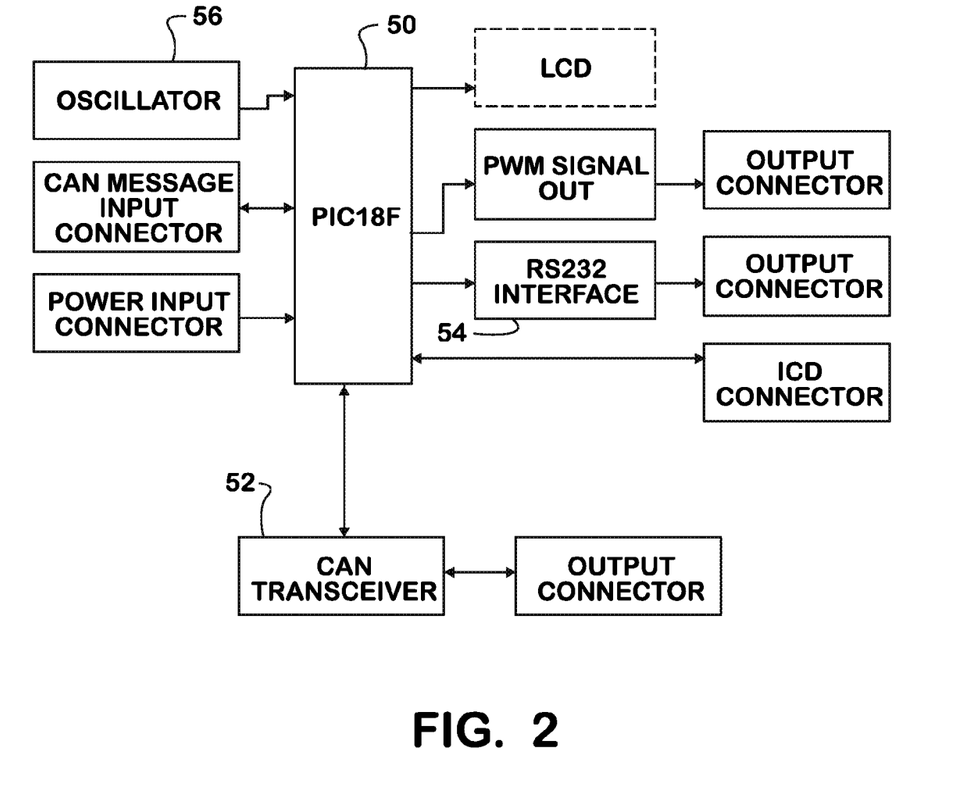
FIG. 2 is a schematic block diagram showing general arrangement of the module.

The block diagram of FIG. 2 shows the basic elements that will be more fully explained later with reference of the detailed diagram of FIG. 3. The basic elements are the microcontroller 50, a CAN transceiver 52, and a RS232 transceiver 54. An oscillator 56 controls the rate at which the microcontroller 50 operates to process data.

The elements just described are shown in FIG. 3 along with additional elements that include regulated power supplies 58, 60 and a reset circuit 62. The wiring designations are carried over in FIG. 3 although it is understood that the wires coming from connectors 12 and 14 in FIG. 3 are internal to module 10. Because microcontroller 50 outputs a pulse width modulated (PWM) signal that represents the value of a CAN parameter that is input to CAN transceiver 52, RC integrators 64, 66 integrate the PWM signal to provide analog signals that are transmitted by output at connector 14 via. One of the two integrators 64, 66 is a surface mount type device that possesses a constant frequency response. The other of the two integrators 64, 66 is formed by discrete components separately mounted on the circuit board to allow their values to be changed and thereby change the frequency response of the integrator. The bundled wires 36A comprise wires 36TX, 36RX, 36INT1, and 36INT2 in FIG. 3. Decoded CAN messages are transmitted via wire 36TX to transceiver 28, and signals received by transceiver 28 from a PDA 300 (FIG. 8) are transmitted from the transceiver to module 10. The analog signals from integrators 64, 66 are transmitted via wires 36INT1 and 36INT2.

Figure 4:
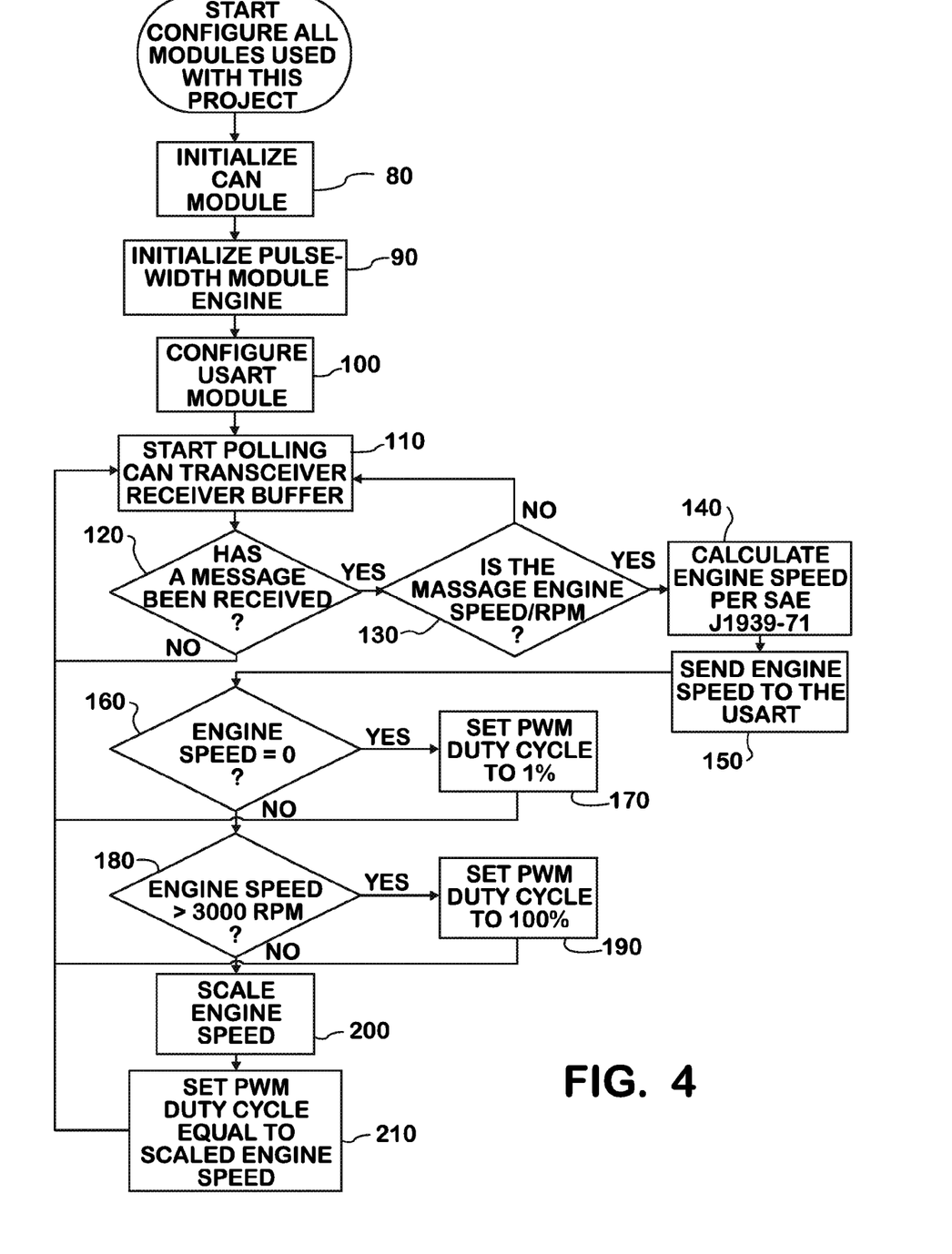
FIGS. 4, 5, and 6 are various flow diagrams related to use and operation of the microcontroller's embedded algorithm and configuration sequences.

FIG. 4 show a flow diagram 70 by which module 10 configures the microcontroller to perform the task earlier described. The first step 80 comprises initializing a CAN module in microcontroller 50 so that it is enabled to read CAN data and convert it to a form from which a corresponding PWM signal can be developed. The second step 90 comprises initializing a PWM module in microcontroller 50 for developing the PWM signal. The third step 100 comprises configuring a USART module in microcontroller 50, which allows the converted CAN data to be transmitted in a digital format to an RS232 enable device.

Once the modules in microcontroller 50 have been configured, the microcontroller begins polling the receive buffer of transceiver 52 (step 110). The polling continues (step 120) until a message is received. The message is read to determine if it is the particular parameter of interest, engine speed in this instance (step 130). If it is not the parameter of interest, the message is ignored, and polling is continued.

Once a message of interest, such as an engine speed message, has been received, microcontroller 50 performs a calculation that converts the message into digital data according to a protocol, SAE J1939 in this instance (step 140). The digital data is processed by the USART module in microcontroller 50 (step 150).

If the engine is not running, the serial data represents an engine speed of zero revolutions per minute (step 160), and the width of the PWM signal is set to 1%. An updated speed message is sought starting at step 110 (step 170).

When the digital data represents a non-zero engine speed, it is necessary to determine if that speed is greater than a defined maximum allowable engine speed, such as 3000 revolutions per minute in this example (step 180). If it is, then the width of the PWM signal is set to 100% (step 190).

If the digital data represents a non-zero engine speed less than the maximum allowable speed, then the width of the PWM signal is scaled to the appropriate percentage defined by the ratio of the non-zero speed to 3000 (step 200).

Whatever percentage results from steps 160, 170, 180, 190, and 200, the width of the PWM signal has that percentage.

Figure 5:
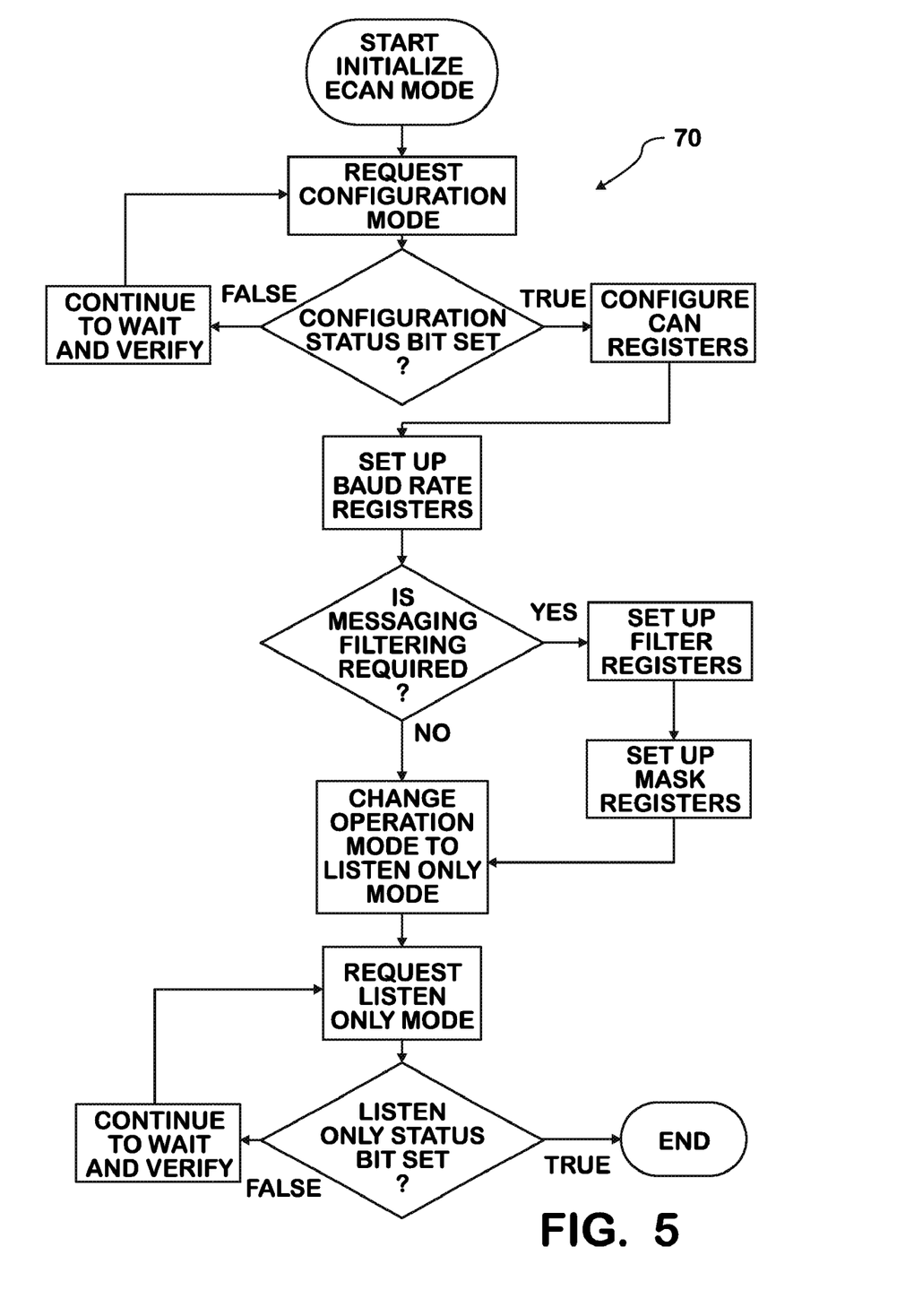

FIG. 5 shows a detailed flow diagram 80 by which microcontroller 50 is prepared for reading a data value on the truck's CAN bus preparatory to developing the PWM signal.

Figure 6:
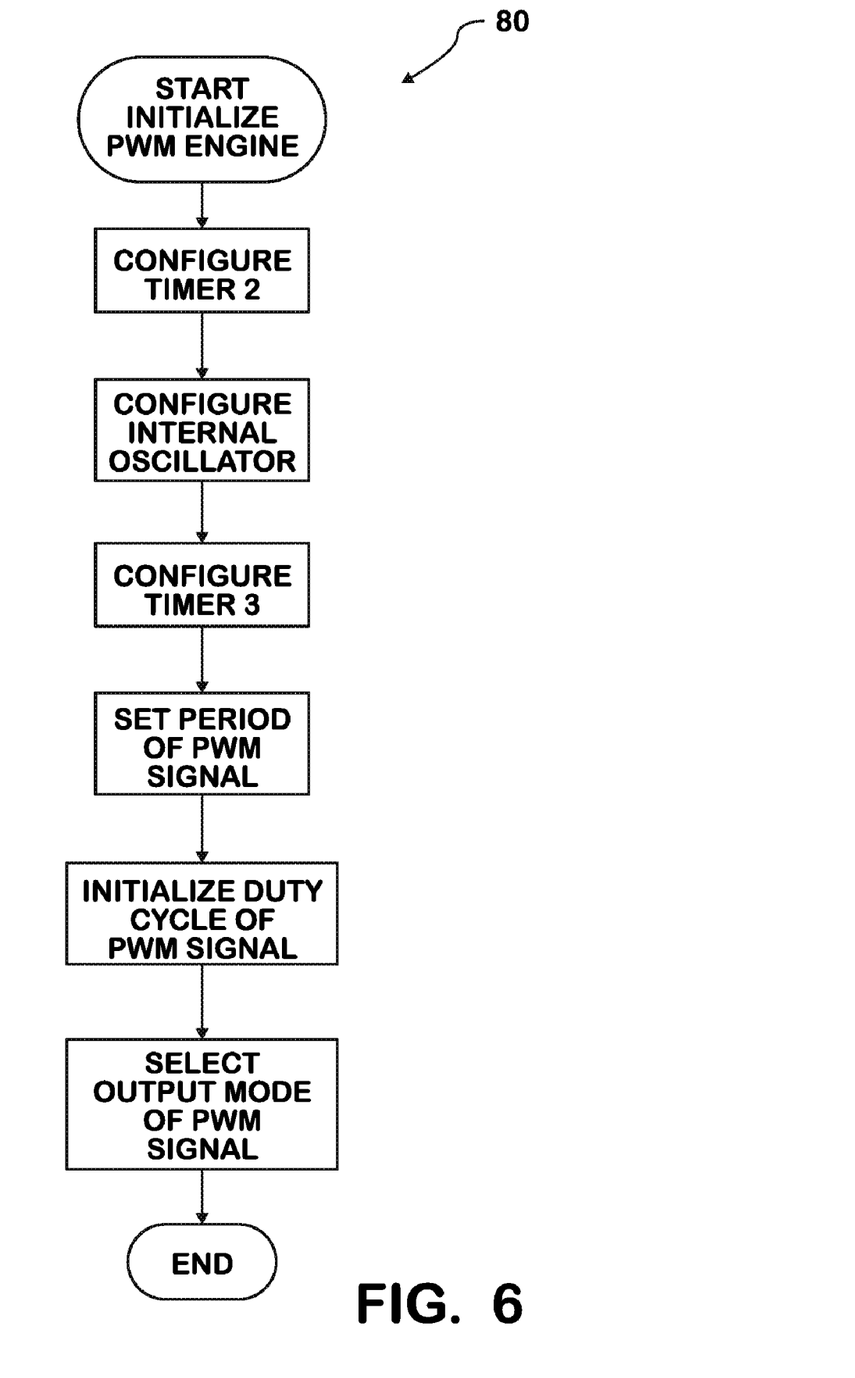

FIG. 6 shows a detailed flow diagram 90 by which the PWM signal is prepared. As part of the initialization process, two timers (Timer 2 and Timer 3) both internal to the microcontroller and an oscillator (which is external to the microcontroller) 50, are configured. Timer 2 aids in setting the period for the PWM signal; the timing of the oscillator acts as a multiplier to step the speed of the time up to the appropriate frequency. During each period set by Timer 2, Timer 3 runs for a length of time corresponding to a pre-determined value (500 cycles); this sets a time base for the PWM. After 500 cycles have completed, the value that was pulled from the CAN bus and then scaled is used to set the duty cycle of the PWM; one of the two integrators is selected to provide the analog signal that will be fed to the radio transceiver 28 and transmitted wirelessly from the radio receiver to a nearby personal digital assistant (PDA), item 300 in FIG. 8, on which the engine speed data can be displayed.

Figure 8:
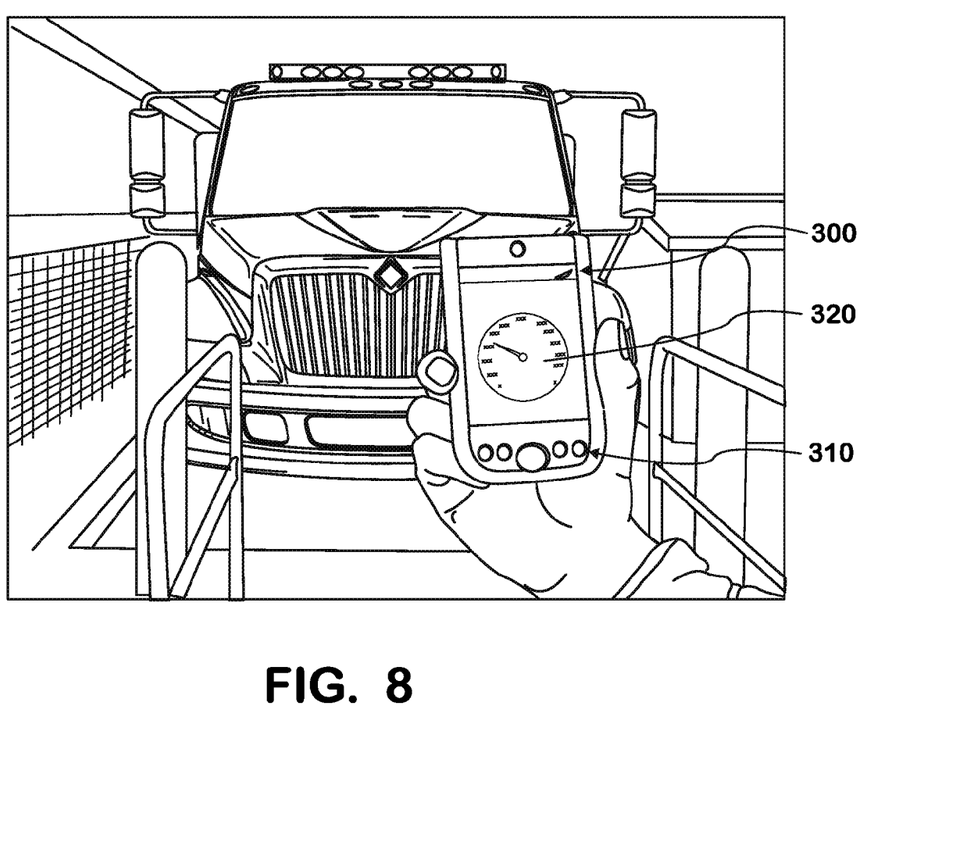
FIG. 8 shows a personal digital assistant (PDA) on which data that has been wirelessly transmitted from the module to the PDA is displayed.

As long as PDA 300 is capable of running LabView (software sold by National Instruments), data will be displayed both numerically and graphically. The display 320 on the PDA is an electronic simulation of a pointer like that of an air core gauge commonly used on automotive vehicle instrument panels. PDA 300 also has the ability to transmit to module 10, and that ability enables the parameter of interest to be changed. To do so, the PDA has controls 310 for calling up a table of different parameters of interest, such as engine speed, engine oil temperature, intake manifold pressure, etc. The table is called up on the PDA display 320 and a particular parameter of interest selected using the controls. Once the selection has been made, the PDA controls are operated to transmit the selection to module 10.

Figure 7:
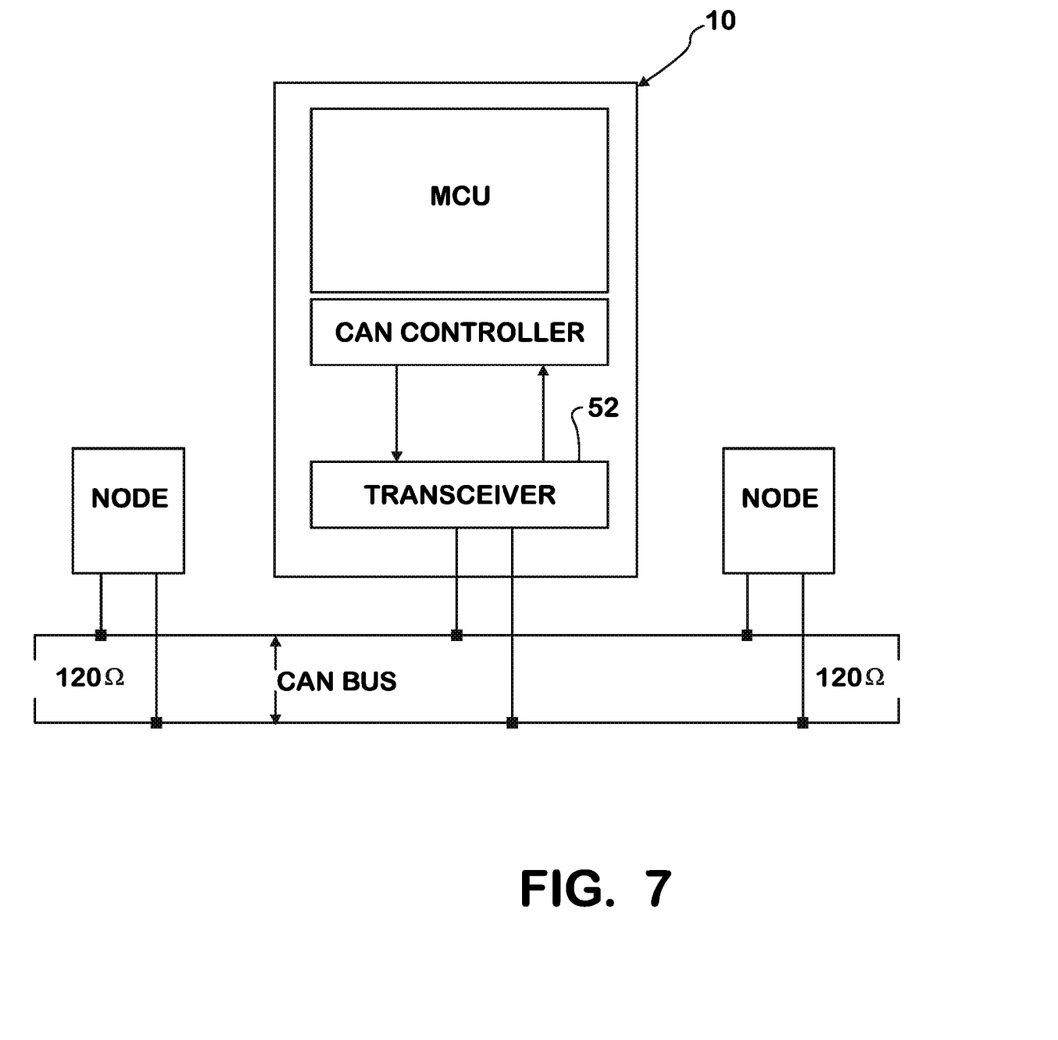
FIG. 7 is a block diagram depicting nodes connected to a CAN bus.

Communication of the PDA with microcontroller 50 occurs through transceiver 54. Any known technology, such as Bluetooth, for establishing communication may be used. A separate cable connects module 10 with the 9-way diagnostic connector in the truck. That cable contains terminating resistors at opposite ends as shown by FIG. 7.

What is claimed is:

1. A module for converting a CAN message into an analog signal comprising:
    one or more connectors providing an input for connection of the module to a CAN bus and an output terminal at which the analog signal is presented;
    a microcontroller containing an algorithm for seeking a particular message on the CAN bus and when the particular message appears on the bus, for converting the particular message to a proportional PWM signal that is presented at an output of the microcontroller; and
    an RC integrator connecting the output of the microcontroller to the output terminal of the one or more connectors at which the analog signal is presented.

2. A module as set forth in claim 1 wherein the one or more connectors include an input terminal that when the one or more terminals are connected to a CAN bus, is also connected to a DC power supply that provides DC power for the module.

3. A module as set forth in claim 2 wherein the module further includes a transceiver through which the microcontroller is connected to the CAN bus.

4. A module as set forth in claim 3 further comprising
    a cable that is external to the module and connected with the one or more connectors of the module to connect the transceiver to the CAN bus, the cable having terminating resistors at opposite ends between individual wires through which the module is connected to the CAN bus.

5. A module as set forth in claim 1 wherein the microcontroller algorithm uses a first timer and a second timer to develop the PWM signal, the first timer being set to define the period of the PWM signal and the second timer being set to define the time base of the PWM signal.

6. A module as set forth in claim 1 further comprising
a radio transceiver connected to the module for transmitting the decoded CAN message wirelessly to a remote device containing a display on which the signal is displayed.

7. A module as set forth in claim 6 further comprising
a transceiver through which the microcontroller connects with the radio transceiver to allow the remote device to set the microcontroller to select a particular one of a number of messages on the CAN bus.

8. A system for converting a CAN message on a CAN bus in a motor vehicle into visual data that can be read on a display:
   one or more connectors providing for connection of a module to the CAN bus and to an electrical power supply of the vehicle;
   the module containing a microcontroller that is powered by the vehicle power supply and contains an algorithm for seeking a particular message on the CAN bus and when the particular message appears on the bus, for converting the particular message to a signal that is presented at an output of the microcontroller;
   a first transceiver for converting the signal at the output of the microcontroller to a wireless signal that is transmitted to a device containing the display; and
   the device comprises a second transceiver for receiving the wireless signal and converting it into visual data on the display.

9. A system as set forth in claim 8 wherein the device contains controls for selecting a particular parameter of interest on the CAN bus and causing a selected parameter to be wirelessly transmitted from the second transceiver to the first transceiver, and the first transceiver causes the selected parameter of interest to be read from the CAN bus by the microcontroller and processed for wireless transmission back to the device.

* * * * *